(12) United States Patent
Murakami

(10) Patent No.: US 8,363,016 B2
(45) Date of Patent: Jan. 29, 2013

(54) TRANSPARENT TOUCH PANEL AND ELECTRONIC APPARATUS

(75) Inventor: Seiichi Murakami, Kameoka (JP)

(73) Assignee: Gunze Limited, Ayabe-shi (JP)

( * ) Notice: Subject to any disclaimer, the term of this patent is extended or adjusted under 35 U.S.C. 154(b) by 1243 days.

(21) Appl. No.: 10/568,416

(22) PCT Filed: Aug. 18, 2004

(86) PCT No.: PCT/JP2004/012141
§ 371 (c)(1),
(2), (4) Date: Feb. 14, 2006

(87) PCT Pub. No.: WO2005/017732
PCT Pub. Date: Feb. 24, 2005

(65) Prior Publication Data
US 2006/0192767 A1    Aug. 31, 2006

(30) Foreign Application Priority Data
Aug. 18, 2003  (JP) ................................. 2003-294103

(51) Int. Cl.
*G06F 3/041* (2006.01)
(52) U.S. Cl. ........................................................ 345/173
(58) Field of Classification Search ........... 345/173–179
See application file for complete search history.

(56) References Cited

U.S. PATENT DOCUMENTS

| | | | | |
|---|---|---|---|---|
| 5,760,862 A | * | 6/1998 | Bachus | 349/149 |
| 6,312,263 B1 | * | 11/2001 | Higuchi et al. | 439/66 |
| 7,002,555 B1 | * | 2/2006 | Jacobsen et al. | 345/173 |
| 7,227,537 B2 | * | 6/2007 | Nakayama et al. | 345/173 |
| 2002/0000979 A1 | * | 1/2002 | Furuhashi et al. | 345/173 |

FOREIGN PATENT DOCUMENTS

| | | |
|---|---|---|
| CN | 1385814 | 12/2004 |
| JP | 56-12855 | 3/1981 |

(Continued)

OTHER PUBLICATIONS

Chinese Office Action dated Apr. 6, 2007 and English translation.

*Primary Examiner* — Dennis Joseph
(74) *Attorney, Agent, or Firm* — Kratz, Quintos & Hanson, LLP

(57) ABSTRACT

A transparent touch panel comprises a transparent first substrate (110) and a second substrate (130) that each has a transparent electro-conductive layer (111, 131) on one surface and that are arranged with a predetermined interval between each other such that the transparent electro-conductive layers (111, 131) are facing each other. Each of the transparent electro-conductive layers (111, 131) has a pair of electrodes (112, 112) and (132, 132) disposed on each end. Lead-out terminals (114, 114) and (134, 134) are connected to each electrode (112, 132) through surrounding circuits (113, 133) formed on the peripheral edges of the transparent first substrate (110) and the second substrate (130). Lead-out terminals (114, 134) are arranged on each of the opposing surfaces of the transparent first substrate (110) and of the transparent second substrate (130), and a plurality of holding members (80, 80), (81, 81) for holding the edges of the transparent first substrate (110) is provided. Each holding member (80, 81) is formed of an electro-conductive material. That portion of the holding member that is inserted between the transparent first substrate (110) and the second substrate (130) is disposed so as to be in contact with each lead-out terminal (114, 134). The transparent touch panel can be reduced in size and cost.

9 Claims, 7 Drawing Sheets

FOREIGN PATENT DOCUMENTS

| | | | |
|---|---|---|---|
| JP | 57-84702 | | 5/1982 |
| JP | 7-129303 | | 5/1995 |
| JP | 3018780 | | 9/1995 |
| JP | 09-045438 | | 2/1997 |
| JP | 9-50731 | | 2/1997 |
| JP | 09045438 A | * | 2/1997 |
| JP | 09050731 A | * | 2/1997 |
| JP | 2000-187237 | | 7/2000 |
| JP | 2000187237 A | * | 7/2000 |
| JP | 2001-092594 | * | 4/2001 |
| JP | 2001-92594 | | 4/2001 |
| JP | 2001-143793 | | 5/2001 |
| JP | 2002259054 | * | 2/2002 |

* cited by examiner

TRANSPARENT TOUCH PANEL AND ELECTRONIC APPARATUS

TECHNICAL FIELD

The present invention relates to a transparent touch panel and an electronic apparatus comprising the transparent touch panel.

BACKGROUND OF THE INVENTION

The structure disclosed in Japanese Unexamined Patent Publication No. 2002-259054 is known as that of a prior art transparent touch panel. As shown in the exploded perspective view of FIG. 7, this transparent touch panel is constructed by laminating a movable substrate 110 and a fixed substrate 130 via a spacer 140, which is a double-coated adhesive tape. The thickness of the double-coated adhesive tape is usually about 50-100 µm. The movable substrate 110 has an input operation surface on the front surface, which receives data input to the transparent touch panel by an operator using a pen or a fingertip.

The spacer 140 is formed into a frame-like shape, and adhered along the periphery of the movable substrate 110 and the fixed substrate 130. The spacer 140 comprises an excised section 141 that functions as an air vent, and a notch 142 to which a connector 120 (described later) is attached. When an air vent is unnecessary, the excised section 141 may not be provided.

Dot spacers 160 are provided with a predetermined interval between each other in the space between the movable substrate 110 and the fixed substrate 130 and surrounded by the spacer 140. A transparent electro-conductive layer 111 and a transparent electro-conductive layer 131 are formed on substantially the entire opposing surfaces of the movable substrate 110 and the fixed substrate 130 except for the periphery. The transparent electro-conductive layer 111 formed on the movable substrate 110 has a pair of electrodes 112, 112, with one each disposed on each of the two ends. Lead-out terminals 114, 114 are connected to the pair electrodes 112, 112 via a surrounding circuit 113 formed on the periphery of the movable substrate 110.

The transparent electro-conductive layer 131 formed on the fixed substrate 130 has a pair of electrodes 132, 132, with one each disposed on each of the two ends. The pair electrodes 132, 132 are arranged so that they are perpendicular to the pair electrodes 112,112 provided on the movable substrate 110. Lead-out terminals 134, 134 are connected to the pair electrodes 132, 132 via a surrounding circuit 133 formed on the periphery of the fixed substrate 130.

The connector 120 comprises connecting terminals 122, 122 on its top surface for being connected to the movable substrate 110, and connecting terminals 123, 123 on its bottom surface for being connected to the fixed substrate 130. Thermocompression bonding, etc., is used to attach the connector 120 to the notch 142 of the spacer 140, thus connecting the connecting terminals 122, 122 and the connecting terminals 123, 123 to the lead-out terminals 114, 114 and lead-out terminals 134, 134 respectively.

Recent years have seen a demand for reducing the number of parts used in various equipment, in order to achieve miniaturization or cost reduction. However, when a connector 120 is used as in the above-described transparent touch panel, it is difficult to reduce the number of parts. In particular, remarkable drawbacks exist in using a connector in portable electronic apparatuses, such as portable personal computers, mobile telephones, and personal digital assistants.

Japanese Unexamined Patent Publication No. 1989-221831 discloses a transparent touch panel that can be connected to an external device without using an additional connector. This transparent touch panel has a structure wherein the portion corresponding to the connector is integrally formed with a movable substrate that is constructed of a transparent film. However, because this portion projects from the periphery of the rectangular movable substrate, trimming loss that occurs in the transparent film when forming the movable substrate increases, and therefore there is room for further improvement in terms of cost reduction.

SUMMARY OF THE INVENTION

The present invention has been accomplished to solve the above problems. An object of the present invention is to provide a transparent touch panel and an electronic apparatus that can be miniaturized and whose cost can be reduced.

This object can be achieved by a transparent touch panel comprising: a transparent first substrate and a second substrate each having a transparent electro-conductive layer on one surface thereof, the transparent first substrate and the second substrate being arranged with a predetermined interval between each other in such a manner that the transparent electro-conductive layers are facing each other, and each transparent electro-conductive layer having a pair of electrodes disposed on each end; a plurality of lead-out terminals being connected to the electrodes through surrounding circuits formed on the peripheral edges of the first substrate and the second substrate, the lead-out terminals each being arranged on the opposing surfaces of the first substrate and the second substrate; and a plurality of holding members for holding the peripheral edges of the transparent first substrate, the holding members being formed of an electro-conductive material and formed so that each of the portions inserted between the transparent first substrate and the second substrate is in contact with each lead-out terminal.

The object of the present invention can also be achieved by an electronic apparatus comprising the above-described transparent touch panel and a display apparatus having connecting terminals, the transparent touch panel being disposed on the display surface side of the display apparatus, and the holding members being in contact with the connecting terminals.

BEST MODE FOR CARRYING OUT THE INVENTION

Hereunder, embodiments of the present invention are explained with reference to the drawings attached. To make the structure easier to understand, each component in the attached drawings is partially expanded or reduced and thus not shown in actual dimensions.

Figure 1:
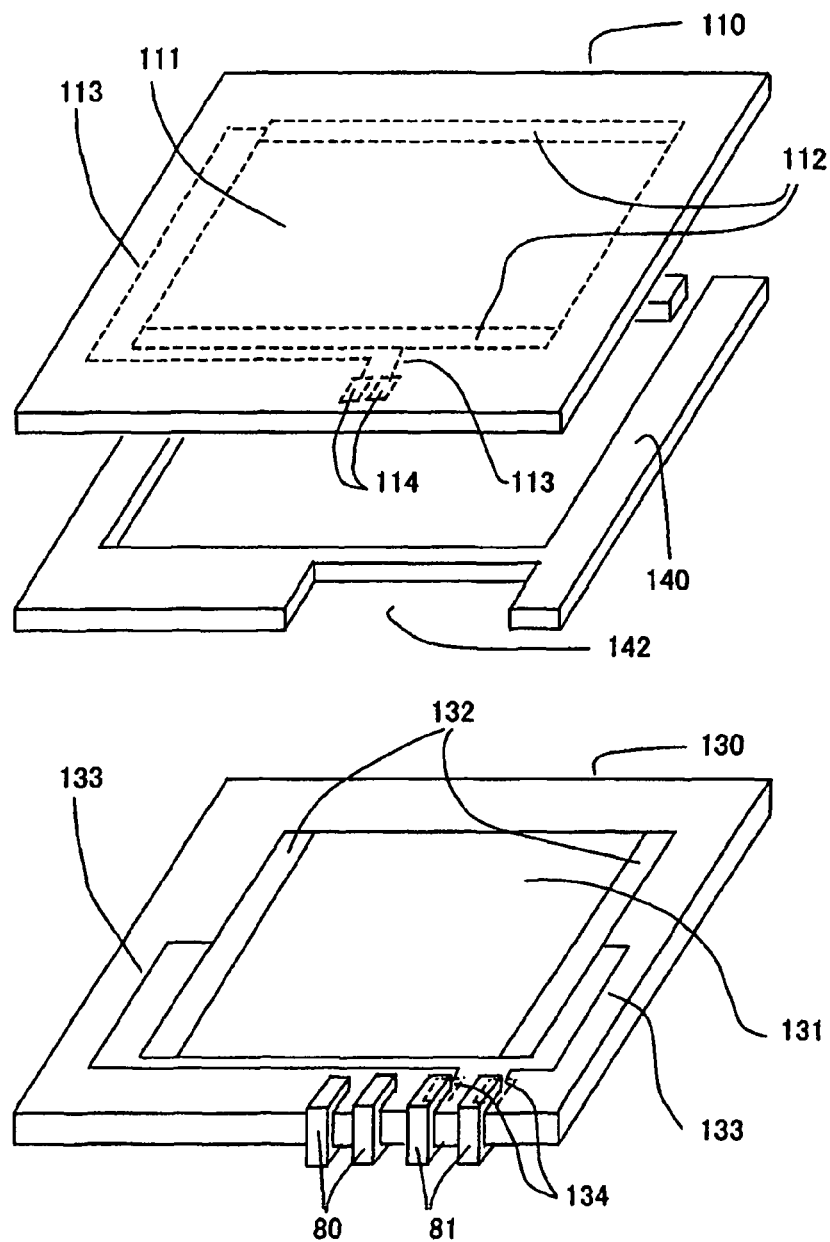
FIG. 1 is an exploded perspective view of a transparent touch panel according to one embodiment of the present invention.
Figure 7:
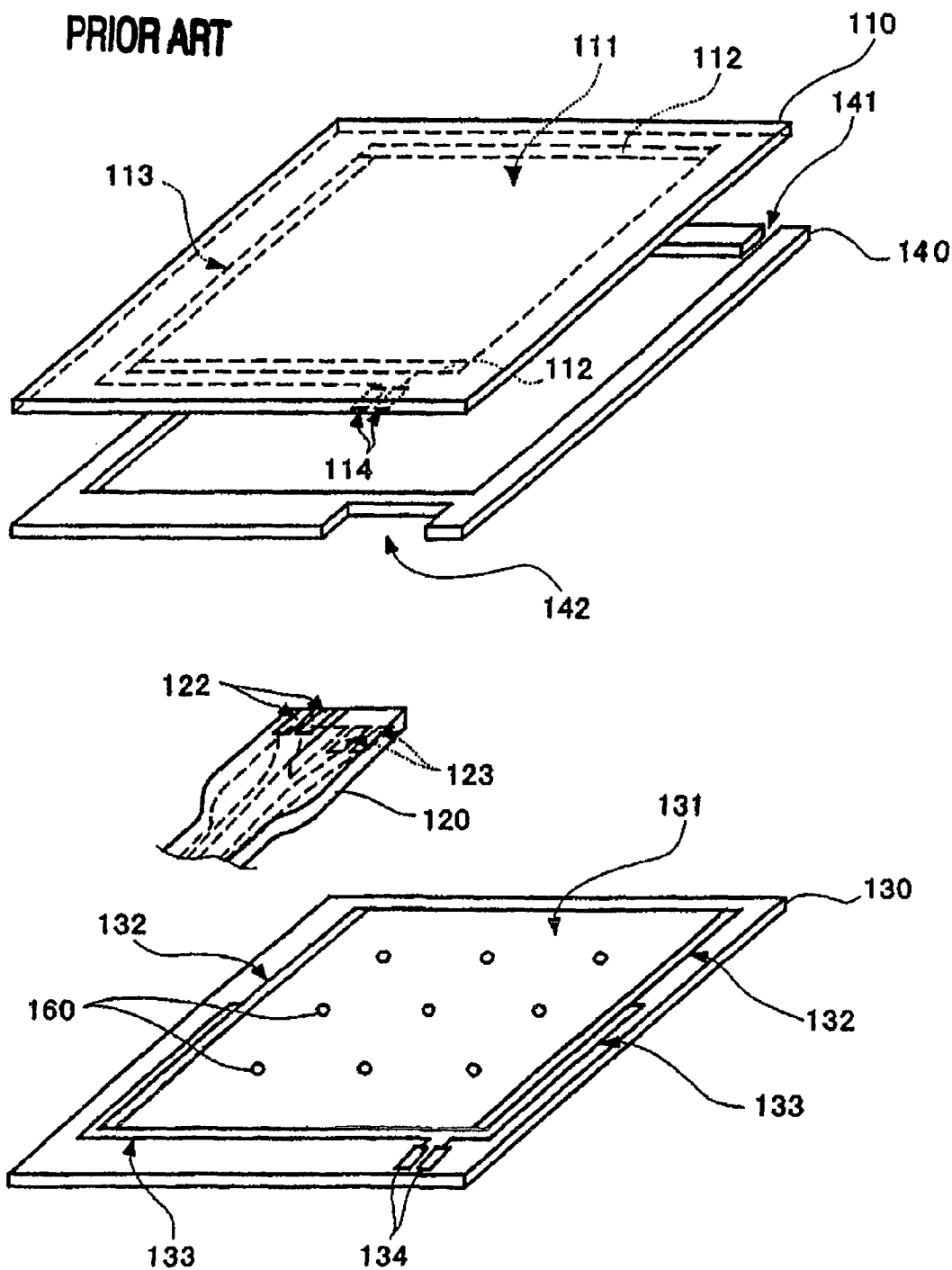
FIG. 7 is an exploded perspective view showing a prior art transparent touch panel.

FIG. 1 is an exploded perspective view of a transparent touch panel of the present embodiment. In the structure of the present embodiment, the same numerical symbols are used for the same constituent components of the prior art transparent touch panel shown in FIG. 7.

Various types of transparent plastic film can be used as the movable substrate 110. Specific examples thereof include polyethylene terephthalate (PET), polyethylene naphthalate (PEN), polyether sulfone (PES), polyether etherketone (PEEK), polycarbonate (PC), polypropylene (PP), polyamide (PA), polyacryl (PAC), norbornene-based thermoplastic transparent resins, etc., or a laminate thereof. By laminating such a transparent plastic film or a laminate thereof with a polarizing plate, a phase plate, a hard coat film, a minute concave-convex film, etc., the flexibility, durability, and visibility at the time of inputting data are improved. The thickness of the film is usually 20-500 μm.

The same materials for the movable substrate 110 may also be used for the fixed substrate 130. It is also possible to use glass. In order to reinforce or improve the durability of the fixed substrate 130, a support medium may be laminated on the fixed substrate 130. The support medium ordinarily used is formed of a polycarbonate resin substrate, acrylic resin substrate, polyolefin-based resin substrate, glass, etc., and has a thickness of 0.5-5 mm. The support medium ordinarily used is flat, but the support medium may have a projection in the center thereof.

The transparent electro-conductive layers 111, 131 on the movable substrate 110 and the fixed substrate 130 may be formed by a general method for providing an electro-conductive material on a film substrate. Specific examples thereof include sputtering, vacuum deposition, ion plating and like PVD methods; CVD methods, coating methods, printing methods, etc. The materials for the transparent electro-conductive layers 111, 131 are not limited as long as they are transparent. Specific examples thereof include indium-tin complex oxide (ITO), tin oxide, copper, aluminum, nickel, chromium, etc. It is also possible to form transparent electro-conductive layers by laminating materials other than those mentioned above. Before forming the transparent electro-conductive layer, an undercoat layer for improving the transparency or adherence may be provided on the movable substrate 110 or fixed substrate 130. Note that it is also possible to provide a transparent electro-conductive layer for shielding on the movable substrate 110 on the opposite surface to which the transparent electro-conductive layer 111 is formed.

The transparent electro-conductive layers 111, 131 are formed so that the peripheries of the movable substrate 110 and the fixed substrate 130 are exposed. The exposed portions can be obtained by forming the transparent electro-conductive layers 111, 131 on the entire surfaces of the movable substrate 110 and the fixed substrate 130, forming a mask having a predetermined pattern on the surface of the transparent electro-conductive layers 111, 131, peeling unnecessary portions of the transparent electro-conductive layers 111, 131 by etching using an acid solution, and removing the patterned mask by dissolving using a remover such as an alkaline solution, etc. The transparent electro-conductive layers 111, 131 may also be removed by using a laser instead of etching with an acid solution.

The pairs of electrodes 112, 112 and 132, 132 formed on both ends of the transparent electro-conductive layers 111, 131 may be formed using a conductive ink. Silver, carbon ink, copper ink and like conductive printable pastes may be used as the conductive ink. Alternatively, silver and carbon may be mixed or recoated. The electrode usually has a width of 0.2 mm to several mm, and a thickness of several μm to several tens of μm. In order to maintain insulation and prevent migration, insulative ink may be applied to necessary portions of the transparent electro-conductive layers 111, 131 or electrodes 112, 132 after forming the electrodes 112, 132. Examples of usable insulative inks are acrylic resin, urethane resin, epoxy resin, silicon resin, etc.

In the peripheries of the movable substrate 110 and the fixed substrate 130, surrounding circuits 113, 133 and lead-out terminals 114, 114 and 134, 134 are formed, and the pairs of electrodes 112, 112 and 132, 132 are connected to the lead-out terminals 114, 114 and 134, 134 via the surrounding circuits 113, 133. The surrounding circuits 113, 133 and the lead-out terminals 114, 134 may be formed at the same time that the electrodes 112, 132 are formed. The lead-out terminals 114, 114 of the movable substrate 110 and the lead-out terminals 134, 134 of the fixed substrate 130 are formed on the opposing surfaces of the movable substrate 110 and the fixed substrate 130 in such a manner that they are adjacent to each other.

The movable substrate 110 and the fixed substrate 130 are attached to each other via a double-coated adhesive tape 140 having a thickness of about 50-100 μm. The double-coated adhesive tape 140 is formed by applying an adhesive on both surfaces of a core film material. Examples of the core film material include polyethylene terephthalate(PET), polyethylene(PE), polypropylene(PP), polyethersulfone(PES) and like plastic films. Acryl-type, silicon-type, and urethane-type adhesive or a mixture thereof may be used as an adhesive. In the double-coated adhesive tape 140, notches 142 are formed in the portions corresponding to the lead-out terminals 114, 114 and 134, 134.

A plurality of clips 80, 80 and 81, 81 each having a U-shape side view are attached to the fixed substrate 130. These clips 80, 80 and 81, 81 are formed of a conductive metal material, and function as holding members for sandwiching the periphery of the fixed substrate 130. In the portions where the clips 80, 80 are inserted between the movable substrate 110 and the fixed substrate 130, the top surfaces of the clips 80, 80 are in contact with the lead-out terminals 114, 114 of the movable substrate 110. In the portions where the clips 81, 81 are inserted between the movable substrate 110 and the fixed substrate 130, the bottom surfaces of the clips 81, 81 are in contact with the lead-out terminals 134, 134 of the fixed substrate 130.

Figure 2:
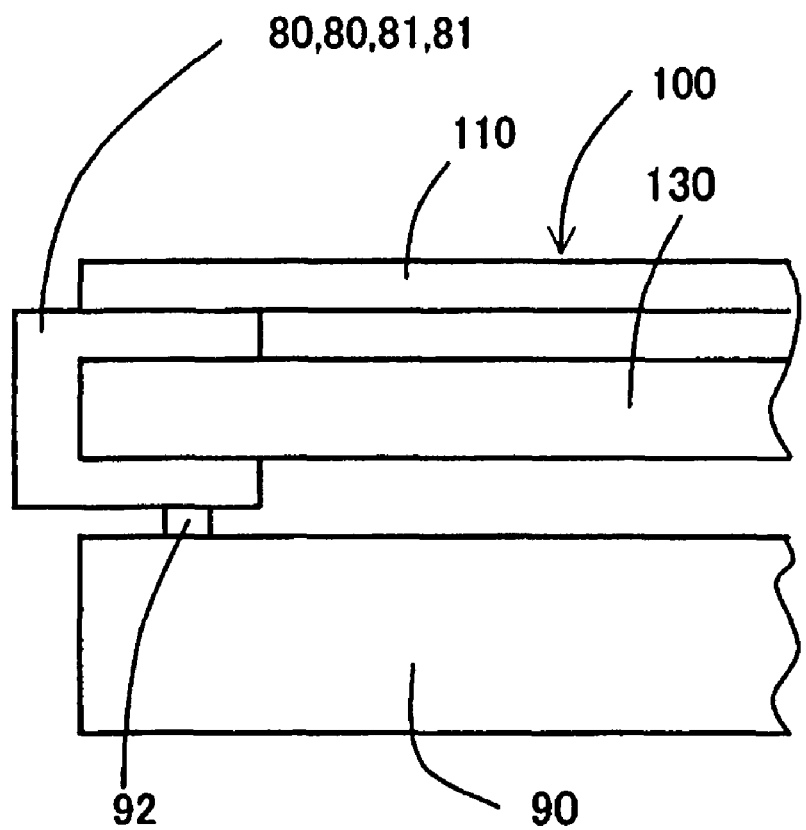
FIG. 2 is a side elevational view of the main part of an electronic apparatus using the transparent touch panel of FIG. 1.

A transparent touch panel having the above-described structure can easily be connected to an external electronic apparatus without using a connector as in prior art techniques because the portions to be connected to the external terminals are exposed by providing the clips 80, 80 and 81, 81. FIG. 2 shows an enlarged view of the principal parts of an example of an electronic apparatus wherein a transparent touch panel 100 is provided on the display surface of a display apparatus 90 such as a liquid crystal display apparatus. In FIG. 2, a connecting terminal 92 is provided on top of the display apparatus 90, and the clips 80, 80 and 81, 81 of the transparent touch panel 100 are in contact with the connecting terminal 92. The portions of the clips 80, 80 and 81, 81 which are in contact with the connecting terminal 92 are not necessarily in the bottom of the touch panel but may instead be on the side surfaces thereof.

In order to strengthen the connection between the connecting terminal 92 and the clips 80, 80 and 81, 81, the connecting terminals 92 may be energized in the upper direction using the elasticity of a spring, etc. It is also possible to provide a conductive adhesive between the connecting terminal 92 and the clips 80, 80 and 81, 81. Paste conductive adhesives, such as a two-component epoxy-based conductive adhesive (product No. 3380B, manufactured by Three Bond Co., Ltd.), are preferably used.

The thickness of the portions in which the clips 80, 81 are inserted between the movable substrate 110 and the fixed substrate 130 is preferably 0.5 to 2 times, and more preferably 0.8 to 1.4 times the space between the movable substrate 110 and the fixed substrate 130. When this thickness is too thin, fitting the clips 80 is difficult and easily causes faulty conduction. When this thickness is too great, faulty conduction or a fault in the winding of the movable substrate 110 tends to occur because of the unduly enlarged space between the movable substrate 110 and the fixed substrate 130.

Figure 3:
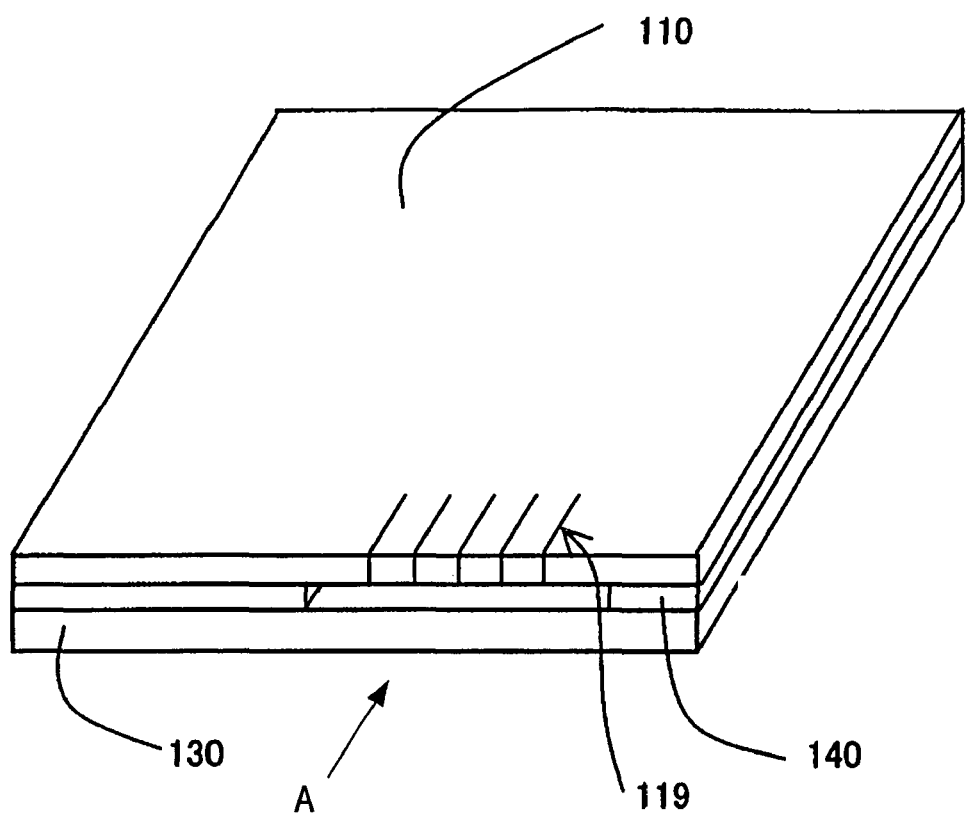
FIG. 3 is a perspective view of a transparent touch panel according to another embodiment of the present invention.
Figure 4:
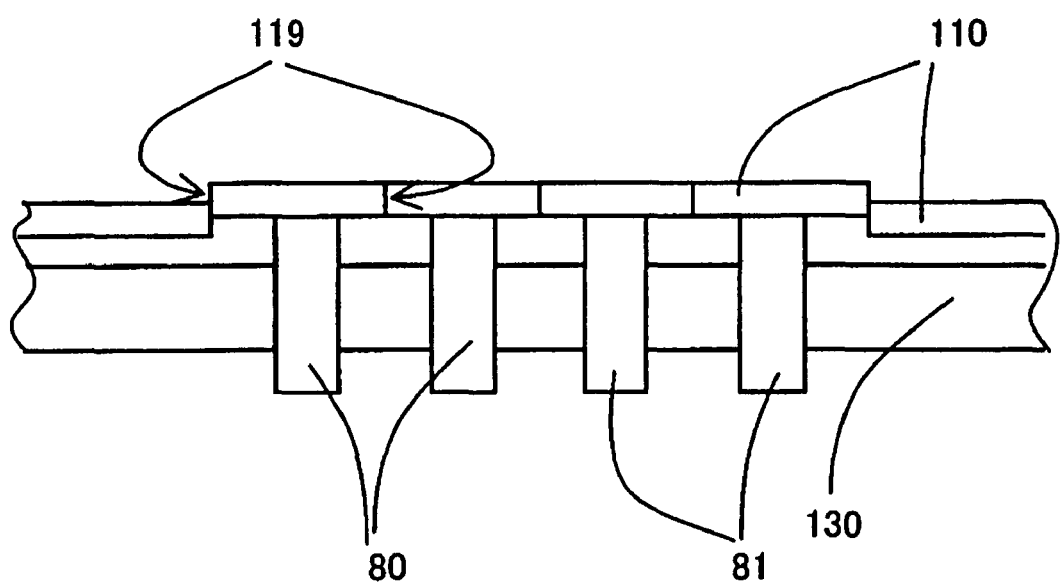
FIG. 4 is a side elevational view of the main part of the transparent touch panel of FIG. 3 as seen from the arrow A.

When the thickness of the portions in which the clips 80, 81 are inserted between the movable substrate 110 and the fixed substrate 130 is greater than the space between the movable substrate 110 and the fixed substrate 130, it is preferable that a notched portion 119 be formed in the movable substrate 110 at the portion which is in contact with the clip 80, as shown in FIG. 3. This allows only the portion of the movable substrate 110 in which the notched portion 119 is formed to be warped upward with the clips 80 being inserted between the movable substrate 110 and the fixed substrate 130 as shown in FIG. 4. This prevents the whole movable substrate 110 from twisting. Using the pressing force generated by the warp of the portion in which the notched portion 119 is formed, connection between the lead-out terminals 114, 114 of the movable substrate 110 and the clips 80, 80 are secured. Each score of the notched portion 119 may be such that, as shown in FIG. 4, the movable substrate 110 independently exhibits flexibility in accordance with each individual clip 80, 80 and 81, 81 or the portion of the movable substrate 110 in which the clips 80, 80 and 81, 81 are formed exhibits flexibility as a whole.

Figure 5:
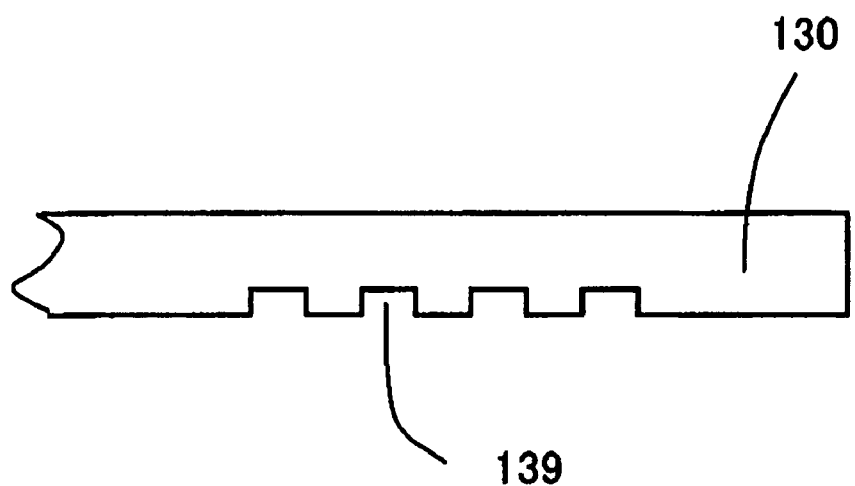
FIG. 5 is a side elevational view of the main part of the fixed substrate of a transparent touch panel of still another embodiment of the present invention.
Figure 6:
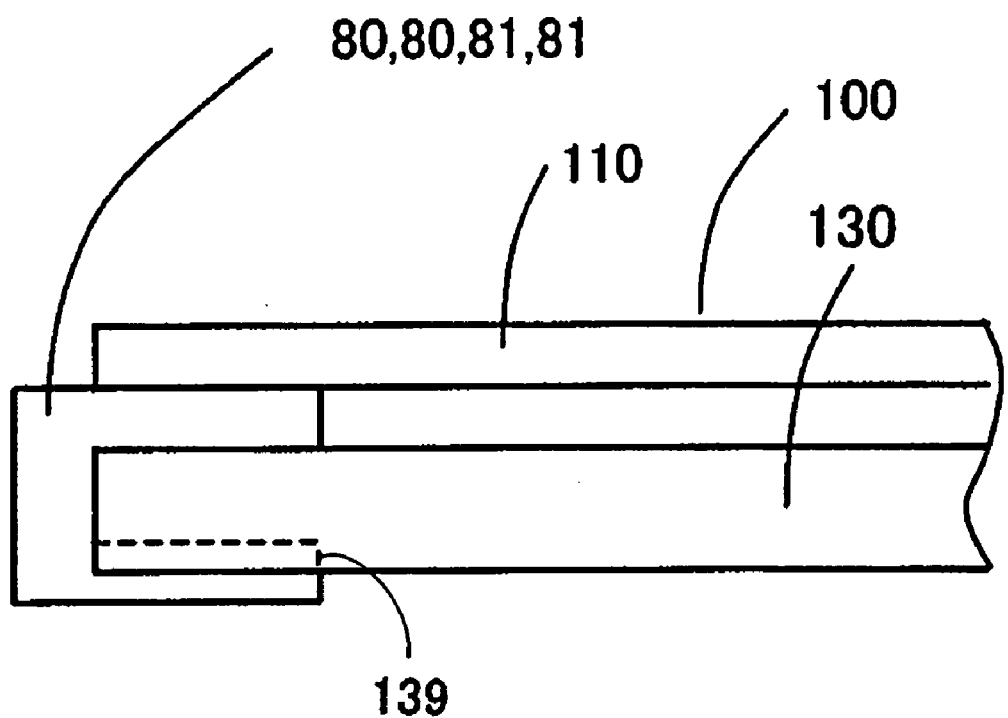
FIG. 6 is a side elevational view of the main part of a transparent touch panel using the fixed substrate of FIG. 5.

As shown in FIG. 5, a plurality of groove portions 139 may be formed corresponding to the clips 80, 80 and 81, 81 in the periphery of the fixed substrate 130 on the surface opposite to that on which the transparent electro-conductive layer 131 is formed. This holds the bottom portions of the clips 80, 80 and 81, 81 in the groove portions 139 as shown in FIG. 6, preventing misalignment of the clips 80, 80 and 81, 81.

The shape, dimensions, and thickness of the clips 80, 80 and 81, 81 are not limited, and they may be strengthened by bending a portion thereof. Furthermore, the clips 80, 80 and 81, 81 may be formed of a metal foil as long as they can be attached to the transparent touch panel 100. The clips 80, 80 and 81, 81 also need not be wholly made of metal but a resin may be used in some portions thereof.

In the present embodiment, a resistive film-type transparent touch panel wherein a space is formed between the movable substrate 110 and the fixed substrate 130 is explained; however, the present invention is also applicable to a transmission capacitive-style transparent touch panel wherein an adhesive tape, etc., is provided on the entire surface between the transparent electro-conductive layers 111, 131.

INDUSTRIAL APPLICABILITY

The present invention provides a transparent touch panel and an electronic apparatus which enable miniaturization and cost reduction.

The invention claimed is:

1. A transparent touch panel comprising;
a transparent first substrate and a second substrate each including a transparent electro-conductive layer on one surface thereof, the transparent first substrate and the second substrate being arranged with a predetermined interval between each other in such a manner that the transparent electro-conductive layers are facing each other, each transparent electro-conductive layer including a respective pair of electrodes disposed on each end thereof:
a plurality of lead-out terminals being connected to the electrodes through surrounding circuits extending to the peripheral edges of the first substrate and the second substrate, the lead-out terminals each being arranged on the opposing surfaces of the first substrate and the second substrate; and
a plurality of holding members that pinch a peripheral edge of only the transparent first substrate so as to sandwich a periphery of the transparent first substrate, the holding members being formed of an electro-conductive material and arranged so that each holding member includes a portion inserted between the transparent first substrate and the second substrate and in contact with at least one respective lead-out terminal of either the first or second substrate;
each of the transparent first substrate and the second substrate including at least one of the lead-out terminals thereof being in contact with at least one of the holding members; wherein
at least one of the holding members is arranged such that the portion inserted between the first substrate and the second substrate is in contact with the lead-out terminal of the first substrate;
at least another one of the holding members is arranged such that the portion inserted between the first substrate and the second substrate is in contact with the lead-out terminal of the second substrate, and
wherein the thickness of the portions of the holding members inserted between the transparent first substrate and the second substrate is 0.5 to 2 times the space between the transparent first substrate and the second substrate.

2. The transparent touch panel according to claim 1, comprising notched portions formed in a portion of the second substrate which is in contact with the holding members.

3. The transparent touch panel according to claim 2, wherein a warp of the notched portions generates pressing force between the movable substrate and the holding members.

4. The transparent touch panel according to claim 1, wherein the transparent first substrate has a plurality of groove portions in the surface opposite to the surface on which the transparent electro-conductive layer is formed, and the holding members are held in groove portions.

5. The transparent touch panel according to claim 1, wherein the transparent first substrate is a fixed substrate.

6. An electronic apparatus comprising the transparent touch panel of claim 1 and a display apparatus including electrically-conductive connecting terminals, the transparent touch panel being disposed on a display surface side of the display apparatus, and the holding members being in direct contact with the connecting terminals, whereby the apparatus and the lead-out terminals are electrically coupled.

7. The electronic apparatus according to claim 6, wherein the holding members are U-shaped, an interior of the U overlaps the at least one peripheral edge of the transparent first substrate, and the connecting terminals are in direct contact with a leg of the U-shape.

8. The transparent touch panel according to claim 1, wherein the holding members are U-shaped and an interior of the U overlaps the at least one peripheral edge of the transparent first substrate.

9. The transparent touch panel according to claim 1, wherein the peripheral edge of the transparent first substrate is sandwiched between an upper-side surface and a lower-side surface of each holding member.

* * * * *